Jan. 18, 1944. B. L. SMITH 2,339,658
FILM HOLDER WITH LIGHT VALVES OR GUARDS
Filed Nov. 4, 1942 2 Sheets-Sheet 1
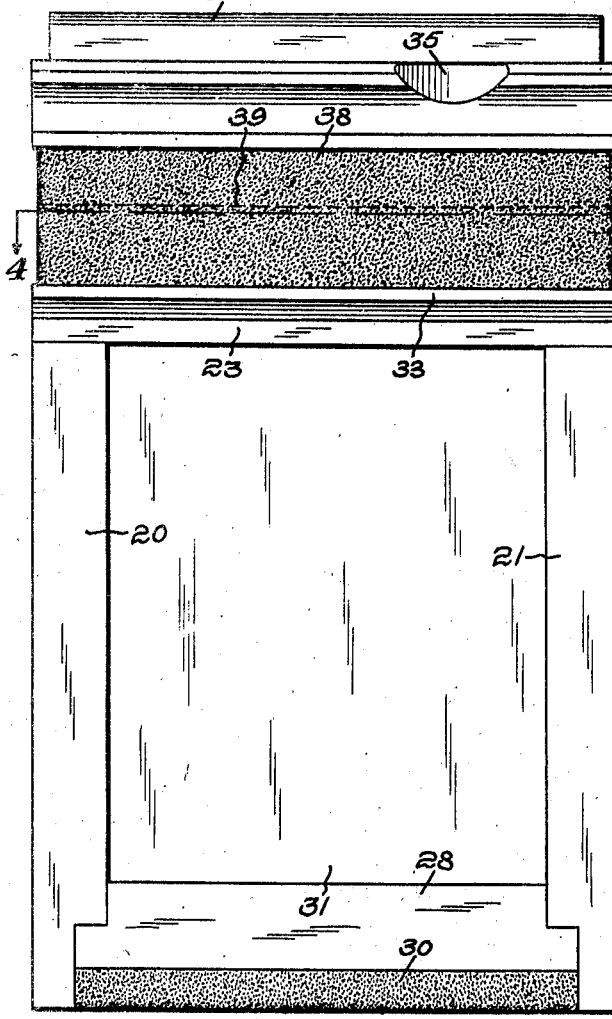
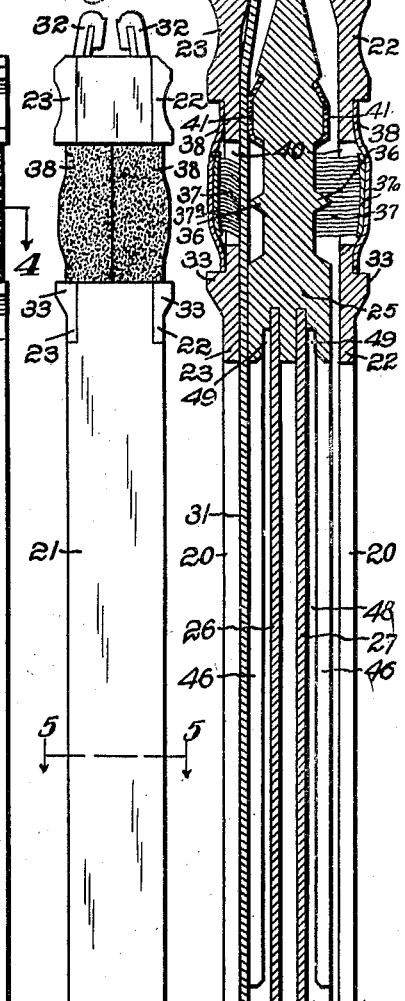
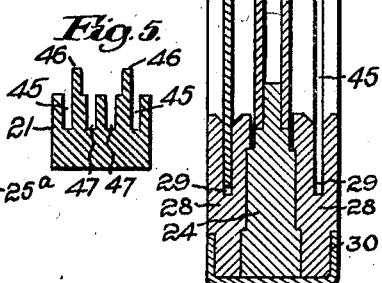
Inventor:
Byron L. Smith,
by Emery, Booth, Townsend, Miller and Weidner
Attys.

Jan. 18, 1944.        B. L. SMITH        2,339,658
FILM HOLDER WITH LIGHT VALVES OR GUARDS
Filed Nov. 4, 1942        2 Sheets-Sheet 2
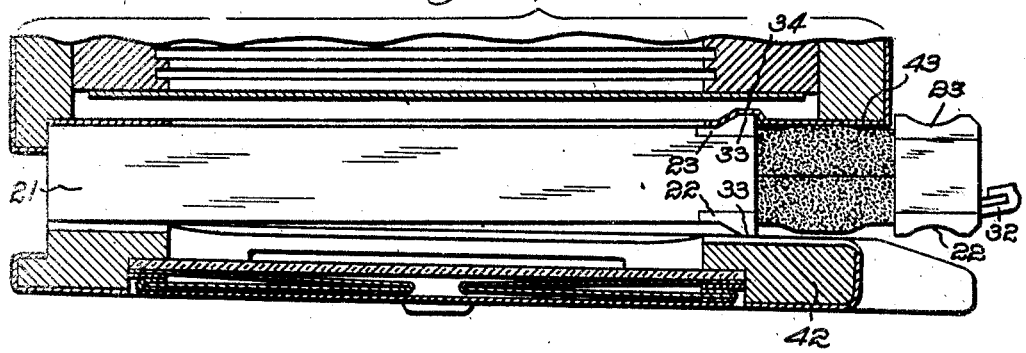
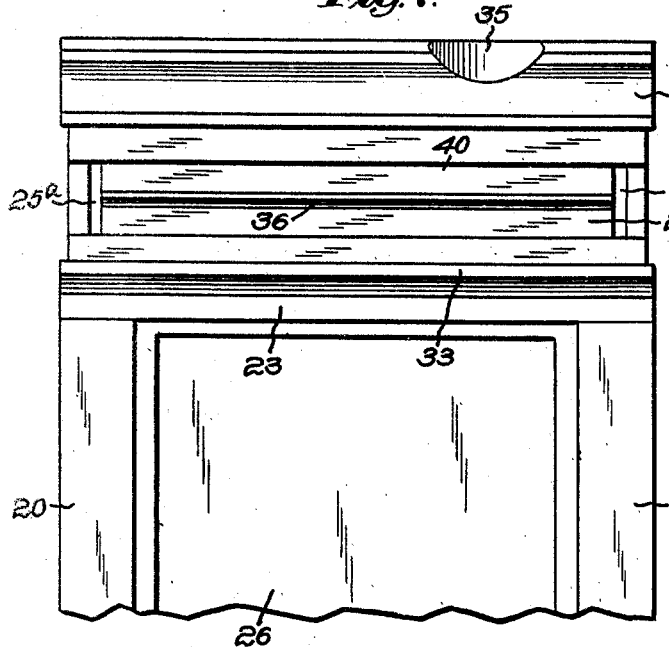
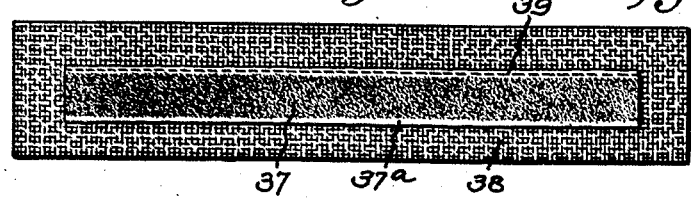
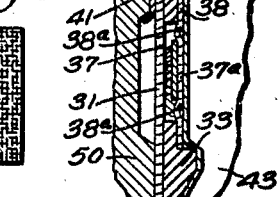
Inventor:
Byron L. Smith Patented Jan. 18, 1944

2,339,658

UNITED STATES PATENT OFFICE 2,339,658

FILM HOLDER WITH LIGHT VALVES OR GUARDS

Byron L. Smith, East Rochester, N. Y., assignor to The Folmer Graflex Corporation, Rochester, N. Y., a corporation of Delaware Application November 4, 1942, Serial No. 464,472

30 Claims. (Cl. 95—67)

This invention relates to a new and improved film holder having an improved light valve or valves.

In order that the principle of the invention may be readily understood, I have disclosed a single embodiment thereof in the accompanying drawings, wherein Fig. 1 is a front elevation of the holder with the dark slides in place;

Fig. 2 is a side elevation of Fig. 1, showing both dark slide handles and the end of the light valves;

Fig. 3 is an enlarged, vertical section through Fig. 1, showing the construction of the holder and the light valves, one of the dark slides being removed;

Fig. 4 is a horizontal section through Fig. 1 on the line 4—4 thereof, showing the construction of the light valves;

Fig. 5 is a partial transverse section through Fig. 2 on the line 5—5 thereof, showing the construction of one of the side rails;

Fig. 6 is a partial transverse section through a camera showing the holder in place, with one of the dark slides thereof removed and the light valves pressed inwardly by the camera back;

Fig. 7 is a side elevation of the upper part of a holder with both slides and the movable member of one of the light valves removed;

Fig. 8 is a vertical section similar to Fig. 3, but showing only the upper portion of a modified form of holder;

Fig. 9 is an inside view in elevation of one of the flexible light valve members; and Fig. 10 is a detail, with parts broken away, in vertical section, of the upper right-hand part of the holder structure shown in Fig. 8, taken through the upper part of the positioned dark slide and through the light valve or guard, and also through the adjacent part of the camera structure, showing the temporarily compacted condition of the pile fabric fibers of the light valve or guard when the dark slide is in the holder and the holder is in position in the camera.

There has long been need for a light valve or guard for sensitized material holders used in photographic cameras that will remain light-tight for a long period of time. This desideratum has not been secured by the many light valves of various types heretofore developed, and some of which are of rather complicated structure.

The use of pile fabric for a light valve or guard for film holders is not new, it having been used for a great many years, but the trouble that has developed in all holders using pile fabric for the light valve or guard is that when the dark slides are left in the holder, the pile fabric is inevitably compressed, compacted or packed down. After the slides are left in the holder for any great length of time, particularly through a weather cycle change (by which I mean if the slide were, for example, placed in the holder during a day of extremely high humidity and left there until the weather changed to normal or low humidity), the pile fabric takes a set and will not restore itself when the slide is removed, so as to render the holder light-tight.

I have conducted a great number of experiments using pile fabric of many different types, and other substitute textile fabrics having a plush-like portion rising from a textile base, some of which I had especially constructed according to instructions by me, and I found that in all cases when the holder was constructed in the usual manner, the pile fabric or other material employed, and which faced outwardly, would not remain light-tight after a short period if the slides were left in the holders. To overcome these difficulties, I have invented the herein disclosed film holder having a new light valve structure, eliminating the above troubles.

One of the objects of the invention is to provide a film holder having a light-tight light valve. Other objects thereof are: to provide a holder having a light valve of extremely low cost; to provide a light valve that will not pack when the dark slides are in place in the holder; to provide a light valve that automatically has pressure applied to the light valve member when the holder is in the camera; and to provide a holder that can be manufactured from "non-strategic" materials, as that term is now employed with reference to war conditions.

In setting forth my invention, I employ the term "pile-fabric" or "pile-fabric-like," not merely in its strictly literal sense to mean a woven fabric in which the "pile" is composed of loops of one of the sets of threads, usually the weft threads, laid into the fabric over pile knives and then severed to provide the upstanding ends constituting the so-called "pile," but also to include any like fabric having a multiplicity of thickly arranged, upstanding loops of a plush thread or threads, such as formed in certain types of knitting machines. The general characteristics of all such fabrics and similar fabrics is an upstanding mass of thickly arranged thread portions rising from the base portion of the fabric, whether the upstanding mass be composed of upstanding severed ends or upstanding loop portions. For brevity of description, I herein use the term "pile-fabric" or "pile-fabric-like" to include all such or like structures.

I will describe the structure and arrangement of the light valves, guard or trap with respect to a particular structure of film or sensitized material holder, but it is to be understood that the light valve, guard or trap herein described may be used in film or sensitized-material holders that are otherwise constructed with respect to certain features or parts of the holder.

An important feature of the invention is the correlation of the light valve, guard or trap with the dark slide or slides, which latter is or are so received in the holder as by their position of rest therein to be flexed slightly outward at or in the vicinity of the light valve area or zone, with the result that when the holder is not in the camera, the basal fabric or sheet of the light valve, guard or trap is pushed or forced outward by the dark slide or slides, thus relieving what may be defined as the compacting pressure inward on the pile fabric itself. When the holder is placed in the camera, the pressure that is applied by the camera back to the contacting back of the holder itself will cause the basal fabric of the light valve, guard or trap to be pushed or moved inwardly, thus more or less compressing the pile fabric itself against the outer surface of the adjacent dark slide, and where the holder has two opposite dark slides, the effect is the same at the corresponding areas or zones of both dark slides. When a dark slide is removed from the holder, the pile fabric of the light valve, guard or trap will spring or move inward or so relieve its compressed condition as to engage closely the central member of the holder and thus exclude all light from entering the holder.

Without limiting my invention thereto, I will set forth one example of the application of my invention.

Referring first to Figs. 1 to 5, the film or sensitized material holder is shown as made up of side rails 20, 21, face members 22, 23 extending to the top edge of the holder, a bottom cross member 24 that is mortared into the side rails 20, 21, a central member 25 at the upper end portion of the holder which is also mortared into the side rails 20, 21, as particularly shown in Fig. 1, separators 26, 27, flaps 28 held to the bottom cross member 24 by a fabric hinge 30, and two dark slides 31 having handles 32. The face members 22, 23 are provided at their lower parts with ledges 33, 33 for engaging a depression 34 in the camera back, as shown in Fig. 6. The said face members 22, 23 are provided at their extreme upper edges with notched-out formations 35 to provide easy access to the slide handles 32. The said central member 25 is provided with opposite, preferably substantially triangular projections 36, 36, shown in Fig. 3, to be engaged by the so-called pile-fabric-like portion 37 of the light valve, guard or trap.

The light valve, guard or trap itself is shown alone in Fig. 9, and is shown as applied to the holder in Figs. 1 to 4, 6 and 8. Referring to these figures and particularly to Fig. 4, there is represented at 38 a strip of flexible material of thin sheet-like character and which is desirably but not necessarily a textile fabric readily flexible and having a coated backing that is desirably similar to imitation leather. This strip 38 of flexible material may if desired be made in two portions of equal length to meet at about midwidth of each edge of the holder, or it may be a single piece of a length sufficient to encircle the holder.

Suitably secured to said sheet-like material 38, as by cementing and by stitching along one or more lines as indicated at 39, is the so-called pile fabric or pile-like fabric 37, which may consist of a woven base indicated at 37a in Figs. 3 and 8, and from which extend the thick mass of thread portions constituting the so-called pile or plush or the like, indicated at 37.

In each face member 22, 23, as best indicated in Figs. 3 and 8, there is provided an opening or recess 40, and extending transversely of the face member 22, 23 respectively there is also provided at each edge portion of the central member 25 a groove 25a, as best shown in Fig. 4. The pile fabric-like material 37 extends into the said openings 40 and the said grooves 25a, thus excluding all light from around the edges of the dark slides 31, it being evident that while the holder herein shown is one adapted to receive two films or other sensitized surfaces, my invention is equally applicable to holders receiving but a single film or sheet of sensitized material and therefore having but a single dark slide. The flexible strip 38, whether made in a single piece or in two equal length pieces, is in its entirety of sufficient length to be wrapped around the holder and to be cemented thereto as clearly indicated in Figs. 1, 2 and 4. It is cemented at both its upper and lower edges to the holder as shown in Figs. 3 and 8.

As shown in Figs. 3 and 8, to the central member 25 are cemented or otherwise suitably secured pieces or pads of broadcloth or the like 41. The face members 22, 23 provide an opening 41a for the insertion of the dark slides 31. Assuming merely for purposes of explanation that two dark slides are provided, and referring to the upper end of Fig. 3, it will be evident that the opening 41a at the top of the holder is so shaped, constituted or defined by the upper ends of the face members 22, 23 and the central member 25 that each dark slide 31 is, when in place in the holder, flexed or held at its upper end in an inwardly inclined position toward the vertical median line of the holder. This position of one of the dark slides 31 is clearly shown at the upper end of Fig. 3, and such position of the dark slides effects firm or complete contact with the broadcloth pieces or pads 41, 41, with the result that all light is cut off from entering along the dark slide at the sensitized-material side thereof, and cooperates in effecting a complete light-excluding contact of the pile-fabric-like material 37 with the outer face of each of the dark slides 31. Thus light is cut off from entering at either face of the dark slide.

While pile fabric has heretofore been employed in a light valve or guard, it has never been so positioned that pressure upon the light valve structure at the back of the camera caused the light valve to be moved inwardly to become more efficient. In prior constructions, when the dark slides were left in the holder, the pile fabric has been compressed, compacted or packed down and would not, particularly where there has been a change in the humidity of the atmosphere, restore itself or spring back into upright condition. The result has been that the holder is no longer light-tight.

In the construction herein disclosed, however, it will be evident that when the holder itself is not in the camera, but the dark slide or slides is or are in the holder, the basal sheet-like flexible member 38 is pushed or caused to bulge outwardly by the slightly flexed condition of the dark slide or slides, and this relieves the pressure upon the pile-fabric-like material 37 and prevents the compacting thereof that has occurred in previous structures, as above set forth. When the holder is itself placed in the camera, pressure is applied to the back or outside face of the holder by the camera back indicated generally at 42 in Fig. 6. This pressure causes the sheet-like flexible member 38, constituting the basal member of the light valve, guard or trap, to be pushed inwardly by the camera back 43 of the camera indicated generally at 44 in Fig. 6. This compresses the pile-fabric-like material 37 against the adjacent dark slide 31. When such dark slide 31 is, however, removed from the holder, the pile-fabric-like material 37 springs forward (that is, inward) and closely touches or engages the adjacent triangular formation 36, as indicated at the right-hand side of the upper portion of Fig. 3, thus excluding all light from entering the holder from which the dark slide 31 has been withdrawn.

The construction of the side rails 20, 21 of the holder is best indicated in the transverse sectional view Fig. 5, wherein the side rail 21 is represented, it being understood that the other side rail 20 is similarly constructed. As shown in Fig. 5, slots 45, 45 extending lengthwise the holder, are provided for the dark slides 31, 31, and there are also provided inwardly extending lips 46, 46 for retaining the film or sensitized material in the holder. Grooves 47, 47 are also provided for receiving the separators 26, 27. As best shown in Fig. 3, there exists a space 48 between each guide rail 46 and the separator 26 or 27. This structure is also disclosed in Fig. 5.

In the central member 25 there are provided grooves 49, 49 for receiving the sensitized material or films, and when the same have been placed in the holder behind the lips 46, 46 in the grooves 49, 49, the shutter flaps 28, 28 are then closed, securely holding the sensitized material in place. The said shutter flaps are held in the closed position by the dark slides 31 which engage the slots 29 of the flaps 28, as shown at the lower end of Fig. 3.

On extremely small holders it has been found that it is not necessary to provide the triangular formations 36, 36 shown in Fig. 3, and in such cases the central member 25 may be provided with flat, parallel outer walls, as shown in Fig. 8 at 50, 50.

It is unnecessary to show or describe in detail the camera itself, but it is to be understood that the herein described holder may be effectively employed or used in any conventional spring-back camera, though its use is not restricted thereto. Such spring back carries a ground-glass focusing screen, and the back serves to maintain the holder in place, and thus the regular back of such cameras serves to cause the light valve, guard or trap to be moved inward toward the center of the holder. Such spring backs are well known in the art and need not be more fully described.

When the holder is placed in the camera, the spring back 42 of the camera forces inward the basal strip 38 which is very flexible, and likewise when the dark slide is withdrawn from the holder, as indicated at the right-hand side of Fig. 3, the fibers of the pile fabric strip 37 spring or move or straighten inwardly so as to contact with the surface of the central member 25, where the same is of reduced diameter, as indicated in the two forms Figs. 3 and 8.

The merely temporary compacting of the pile fabric fibers, when the dark slide is in the holder and the holder is in position in the camera, is indicated in the sectional detail view Fig. 10, where the back part of the camera body is indicated at 43. Such compacted condition of the fibers of the pile fabric would be a permanent condition, were it not for my invention which provides means for relieving the pressure on the pile fabric at proper times. If the fibers of the pile fabric were compressed into the condition shown in Fig. 10 for any length of time, such fibers would permanently keep such compacted shape or condition and would no longer have sufficient life again to extend or straighten themselves to the condition shown in Figs. 3 and 8.

In Fig. 10, which is a sectional detail taken through the upper right-hand part of the holder shown in Fig. 8, but with the dark slide in place and the holder in the camera, the back whereof is indicated at 43, there is indicated a small fold or wrinkle 38a in the basal member 38. Such a fold or wrinkle occurs in practice or in use, due to the fact that said basal member 38 becomes in use slightly stretched, due to the outward pressure of the pile fabric 37 when such outward pressure is permitted to occur, namely, when the dark slide is withdrawn, as at the right-hand side of Fig. 3 and at both sides of Fig. 8, and the holder is out of the camera.

Thus after such slight stretching has occurred in use, the said basal member 38 will have a normal outward bulge, such as shown in Figs. 2 and 6. Therefore, when the holder is again positioned in the camera, with the dark slide in place, the pile fabric 37 is pushed against the dark slide, and since the basal fabric 38 has previously been slightly stretched in use, as stated, a wrinkle or bulge will be formed in the basal part 38, as indicated at 38a.

The sensitized material or film holder herein described and shown has been thoroughly tested under all conditions and has proven to be absolutely light-tight under all possible working conditions. As already stated, all holders heretofore employing a pile-fabric type of light valve or guard have leaked light after being stored but a short time with the dark slides in place in the holder. But with my invention the only time when there is any pressure that would tend to compact the pile fabric is during that short time when the holder is in the camera and the dark slides are in place in the holder. As soon as a dark slide is withdrawn from the holder, the so-called pile fabric automatically straightens or extends itself and thus closes all possible chance of the entrance of light into the holder.

While the structure herein disclosed is one of few parts and of evident simplicity, it is a matter upon which I have expended a great deal of time in research work to provide a suitable light valve, guard or trap. It has, as above stated, long been recognized that a pile-fabric type of light valve, guard or trap has numerous advantages and provides a perfect light-seal, excepting as the pile fabric became matted, packed down or compacted, as heretofore it has inevitably done, so far as I am aware, if the dark slide or slides were left in the holder for any substantial length of time. This has been so regardless of the particular type or character of so-called pile fabric used. I have experimented with and tested many or all different types of so-called pile fabrics, using many different types of yarns, and with many different types of weave or fabric structure, but until I conceived of and applied, as herein disclosed, the parts arranged herein disclosed, all of such pile fabrics became matted and were no longer light-excluding. The generic or underlying features of my invention have been provided and applied, the result of my invention has been that I can with entire satisfaction use to exclude light many different types of so-called pile fabric which, as heretofore used, became matted and compacted and no longer excluded light.

The holder herein disclosed is desirably constructed from non-strategic materials, as that term is now employed with reference to war conditions, since there is no metal used in the structure as preferably made. The frame work of the holder is desirably constructed of wood, as are also the dark slide handles, and the separators and dark slides are constructed of pressed board.

Having thus described one illustrative embodiment of the invention, it is to be understood that although specific terms are employed, they are used in a generic and descriptive sense and not for purposes of limitation, the scope of the invention being set forth in the following claims.

I claim:

1. A holder for photographic sensitized material having one or more dark slides adapted to be withdrawn from an end of the holder and having a slot-like formation for receiving each dark slide, a light valve or guard at the lateral face or faces of the holder below the upper end of the inserted dark slide or slides, said light valve or guard having a readily flexible strip-like base secured to the holder in a position to be pressed upon and flexed inwardly by the camera back in use, and a pile-fabric-like structure protruding inward from said base so as at that face of said structure that is the more remote from said base, to be pressed without compacting or packing against the outer face of the adjacent dark slide when in position, and to be pressed without compacting or packing against the inner central portion of the holder when the slide is removed, thus in either case providing a light-excluding structure at the location specified.

2. A holder for photographic sensitized material having one or more dark slides adapted to be withdrawn from an end of the holder and having a slot-like formation for receiving each dark slide, a light valve or guard at the lateral face or faces of the holder below the upper end of the inserted dark slide or slides, said light valve or guard having a readily flexible strip-like basal portion secured to the holder and the outer face of which is so located as to be pressed upon by the camera structure when the holder is in position in the camera, the said readily flexible strip-like basal portion having a pile-fabric-like thread mass extending inward from the inner face of said strip-like basal portion, to engage the inserted dark slide or to engage an inner wall of the holder when the dark slide is removed.

3. A structure according to claim 2, but wherein the holder is provided with an inner member between the surface of which and a face member of the holder a flexible dark slide is adapted to be inserted, and wherein such positioning of the dark slide flexes said dark slide outwardly so as to cause it to co-act with the pile-fabric-like thread mass in securing a light-excluding contact of the said pile-fabric-like thread mass with the face of said dark slide.

4. A structure according to claim 2, but wherein the holder is provided with a central member constituting said inner wall of the holder and at opposite faces of which central member two dark slides are adapted to be respectively inserted between outer face members of the holder and said central member.

5. A structure according to claim 2, but wherein the holder is provided with a central member constituting said inner wall of the holder and at opposite faces of which central member two dark slides are adapted to be respectively inserted between outer face members of the holder and said central member, and which central member is provided with outwardly extending projections to be engaged by the pile-fabric-like thread mass so as effectively to exclude light entry to the face of said central member when the respective dark slide is removed.

6. A holder for photographic sensitized material having opposite face members and an intermediate central member between which and said face members two dark slides are adapted to be respectively inserted, each face member having a transversely extending recess or opening at the upper portion of the holder, so that said recesses or openings are opposite each other, and a light valve or guard secured to the holder at and so as to extend into said recesses or openings, said light valve or guard comprising an outer readily-flexible strip-like member to be engaged and pressed inward by the camera back in use, and a pile-fabric-like structure secured to the inner face of said strip-like member so as to engage the outer face of the adjacent inserted dark slide.

7. A holder for photographic sensitized material having opposite face members and an intermediate central member between which and said face members two dark slides are adapted to be respectively inserted, each face member having a transversely extending recess or opening to said central member at the upper portion of the holder, so that said recesses or openings are opposite each other, and a light valve or guard secured to the holder at and so as to extend into said recesses or openings, said light valve or guard comprising an outer strip-like member entirely surrounding the holder so as to overlie said two transversely extending recesses or openings and two pile-fabric-like structures secured to the inner face of said strip-like member so as to extend into the recesses or openings respectively to engage the outer faces of said two dark slides.

8. A holder for photographic sensitized material having opposite face members and an intermediate central member between which and said face members two flexible dark slides are adapted to be respectively inserted, each face member having a transversely extending recess or opening to said central member at the upper portion of the holder, so that said recesses or openings are opposite each other, and a light valve or guard secured to the holder at and so as to extend into said recesses or openings, said light valve or guard comprising an outer strip-like member entirely surrounding the holder so as to overlie said two transversely extending recesses or openings and two pile-fabric-like structures secured to the inner face of said strip-like member so as to extend into the recesses or openings respectively, the dark-slide receiving spaces between the opposite face members and the intermediate central member being such that the flexible dark slides are by the act of their insertion flexed inward at their upper ends.

9. A holder for photographic sensitized material having two, flexible, dark slides and having opposite face members and an intermediate central member between which and said face members said two flexible dark slides are adapted to be respectively inserted, each face member having a transversely extending recess or opening at the upper portion of the holder, so that said recesses or openings are opposite each other, and a light valve or guard secured to the holder at and so as to extend into said recesses or openings, said light valve or guard comprising an outer strip-like member entirely surrounding the holder so as to overlie said two transversely extending recesses or openings and two pile-fabric-like structures secured to the inner face of said strip-like member so as to extend into the recesses or openings respectively, the dark-slide receiving spaces between the opposite face members and the intermediate central member being such that the said flexible dark slides are by the act of their insertion flexed inward at their upper ends, and the said strip-like member being so located and positioned that when the holder is inserted into a camera, pressure of the camera structure upon the outer face of said strip-like member pushes or moves inward the pile-fabric-like material.

10. A holder for photographic sensitized material having one or more dark slides adapted to be withdrawn from an end of the holder and having a slot-like formation for receiving each dark slide, and a light valve or guard at the lateral face or faces of the holder below the upper end of the inserted dark slide or slides, so located and positioned that when the holder is placed in the camera, the pressure that is applied to the back of the holder by the camera back causes the light valve or guard to be compressed against the outer face of the adjacent dark slide, the said light valve or guard for that purpose having the part thereof that directly receives the pressure applied by the camera back, readily flexible and so secured to the outer face of the holder as slightly to flex outward when the holder is not in the camera, but the dark slide is in position in the holder, whereby the act of completely positioning the holder in place in the camera serves to move said light valve or guard inwardly against the outer face of the adjacent dark slide.

11. A holder for photographic sensitized material having one or more dark slides adapted to be withdrawn from an end of the holder and having a slot-like formation for receiving each dark slide, and a light valve or guard at the lateral face or faces of the holder below the upper end of the inserted dark slide or slides, so located and positioned that when the holder is placed in the camera, the pressure that is applied to the back of the holder by the camera back causes the light valve or guard to be compressed against the outer face of the adjacent dark slide, and so that when the said dark slide is removed the inner face of the said light valve or guard engages an inner wall of the said holder, the said light valve or guard for that purpose having the part thereof that directly receives the pressure applied by the camera back, readily flexible and so secured to the outer face of the holder as slightly to flex outward when the holder is not in the camera, but the dark slide is in position in the holder, whereby the act of completely positioning the holder in place in the camera serves to move said light valve or guard inwardly against the outer face of the adjacent dark slide.

12. A holder for photographic sensitized material having one or more dark slides adapted to be withdrawn from an end of the holder and having a slot-like formation for receiving each dark slide, and a light valve or guard at the lateral face or faces of the holder below the upper end of the inserted dark slide or slides, so located and positioned that when the holder is placed in the camera, the pressure that is applied to the back of the holder by the camera back causes the light valve or guard to be compressed against the outer face of the adjacent dark slide, the said light valve or guard for that purpose having a part thereof that directly receives the pressure applied by the camera back, readily flexible and so secured to the outer face of the holder as slightly to flex outward when the holder is not in the camera, but the dark slide is in position in the holder, whereby the act of completely positioning the holder in place in the camera serves to move said light valve or guard inwardly against the outer face of the adjacent dark slide, the said light valve or guard including a pile-fabric-like thread mass secured to the inner face of said readily flexible part and directed inward toward the outer face of the adjacent dark slide.

13. A holder for photographic sensitized material having one or more dark slides adapted to be withdrawn from an end of the holder and having a slot-like formation for receiving each dark slide, and a light valve or guard at the lateral face or faces of the holder below the upper end of the inserted dark slide or slides, so located and positioned that when the holder is placed in the camera, the pressure that is applied to the back of the holder by the camera back causes the light valve or guard to be compressed against the outer face of the adjacent dark slide, said light valve or guard including an outer, flexible, strip-like base to be engaged by the camera back, and also including a pile-fabric-like thread mass secured to the inner face of said strip-like base, and adapted to be pressed inward by the said pressure of the camera back, so as to engage the outer face of the adjacent dark slide.

14. A holder for photographic sensitized material having one or more dark slides adapted to be withdrawn from an end of the holder and having a slot-like formation for receiving each dark slide, and a light valve or guard at the lateral face or faces of the holder below the upper end of the inserted dark slide or slides, so located and positioned that when the holder is placed in the camera, the pressure that is applied to the back of the holder by the camera back causes the light valve or guard to be compressed against the outer face of the adjacent dark slide, but so that when the holder is not in the camera, but a dark slide is positioned in the holder, inwardly directed pressure is relieved from the light valve the said light valve or guard for that purpose having the part thereof that directly receives the pressure applied by the camera back, readily flexible and so secured to the outer face of the holder as slightly to flex outward when the holder is not in the camera, but the dark slide is in position in the holder, whereby the act of completely positioning the holder in place in the camera serves to move said light valve or guard inwardly against the outer face of the adjacent dark slide.

15. A light valve or guard adapted to be secured to a holder for photographic sensitized material, so that its outer surface is presented to the camera back when the holder is placed in the camera, said light valve or guard consisting of a strip-like flexible base that is to be secured to the holder, and a pile-fabric-like thread mass that is adapted, when the said light valve or guard is secured to the holder, to engage the outer face of the adjacent dark slide.

16. A light valve or guard adapted to be secured to a holder for photographic sensitized material, so that its outer surface is presented to the camera back when the holder is placed in the camera, said light valve or guard consisting of a strip-like flexible base that is to be secured to the holder, and a pile-fabric-like thread mass that is adapted, when the said light valve or guard is secured to the holder, to engage the outer face of the adjacent dark slide, the said thread mass extending from and forming a part of a textile base, said textile base being secured to said strip-like flexible base.

17. A holder for photographic sensitized material having at least one flexible dark slide adapted to be inserted and withdrawn at the end of the holder and there having a slot-like formation for receiving such flexible dark slide, said holder including a face member provided with a transversely extending recess or opening at the upper portion of the holder, and a light valve or guard secured to the holder at, and so as to extend into, said recess or opening, said light valve or guard for that purpose comprising an outer strip-like member overlying said recess and secured to the outside of said face member of said holder adjacent said recess or opening, and a pile-fabric structure secured to the inner face of said strip-like member so as to extend into the said recess or opening, the said dark-slide-receiving slot-like formation being such that said flexible dark slide is, by the act of its insertion, flexed inward at its upper end, the said strip-like member being so located and positioned that when the holder is inserted in a camera, pressure of the camera structure upon the outer face of the strip-like member pushes or moves inward the pile-fabric-like member.

18. A photographic holder in accordance with claim 17, but wherein said transversely extending recess or opening also extends inward to the body portion of the holder that is back of said dark slide when the latter is inserted.

19. A photographic holder in accordance with claim 17, but wherein said transversely extending recess or opening also extends inward to the body portion of the holder that is back of said dark slide when the latter is inserted, and wherein said outer strip-like member is readily flexible so as to yield readily when pressed upon by the camera structure.

20. A photographic holder in accordance with claim 17, but wherein said transversely extending recess or opening also extends inward to the body portion of the holder that is back of said dark slide when the latter is inserted, and wherein said outer strip-like member is readily flexible and is secured at its upper and lower edges to the outer surface of said face member both above and below said transversely extending recess or opening therein.

21. A photographic holder in accordance with claim 17, but wherein said transversely extending recess or opening extends inward past the path or plane of the dark slide, and at its bottom said recess or opening is provided with a ridge positioned transversely of the holder and extending outward from the bottom of the recess or opening, but spaced from the upper and lower edges of said recess or opening, and adapted to be engaged by the said pile-fabric-like structure when the dark slide is removed.

22. A photographic holder in accordance with claim 17, but wherein the body of said holder adjacent the face of the positioned dark slide, and above the said recess or opening, is provided with a cloth-like member 41 to make firm contact with the inner face of such positioned dark slide, and thereby to cooperate in effecting a complete light-excluding contact of the pile-fabric-like structure with the outer face of such dark slide.

23. A photographic holder in accordance with claim 17, but wherein in the body of said holder adjacent the inner face of the positioned dark slide, and above the said recess or opening, is provided with means making firm contact with the inner face of such positioned dark slide across the width thereof, thereby cooperating to effect a complete light-excluding contact of the pile-fabric-like structure with the outer face of such dark slide.

24. A holder for photographic sensitized material having at least one dark slide adapted to be inserted and withdrawn at an end of the holder and there having a slot-like formation for receiving such dark slide, such holder including a face member provided with a transversely extending recess or opening at the upper portion of the holder, and a light valve or guard secured to the holder at, and so as to extend into, said recess or opening, said light valve or guard for that purpose comprising an outer strip-like member overlying said recess or opening and secured to the outside of said face member of said holder adjacent said recess or opening, and a pile fabric-like structure secured to the inner face of said strip-like member so as to extend into the said recess or opening, the said strip-like member being so located and positioned that when the holder is inserted in a camera, pressure of the camera structure upon the outer face of said strip-like member pushes or moves inward the pile fabric-like structure.

25. A photographic holder in accordance with claim 24, but wherein the body of said holder adjacent the inner face of the positioned dark slide, and above the said recess or opening, is provided with means making firm contact with the inner face of such positioned dark slide across the width thereof, thereby cooperating to effect a complete light-excluding contact of the file-fabric-like structure with the outer face of such dark slide.

26. A photographic holder in accordance with claim 17, but wherein the said strip-like member is of readily flexible woven material and wherein the said pile-fabric-like structure is served to the inner face of said strip-like member.

27. A holder for photographic sensitized material having one or more dark slides adapted to be withdrawn from an end of the holder and having a slot-like formation for receiving each dark slide, a light valve or guard at the lateral face or faces of the holder below the upper end of the inserted dark slide or slides, said light valve or guard having a strip-like base secured to the holder in a position to be pressed upon by the camera back in use, and having a pile-fabric-like structure protruding from said base so as at that face of said structure that is the more remote from said base, to be pressed against the outer face of the adjacent dark slide when in position, said light valve or guard constituting and providing means whereby, when the holder is in the carrier and the dark slide is withdrawn, the said pile-fabric-like structure is pressed against the inner body portion of the holder, whereby in either case there is provided an effective light-excluding structure at the location specified.

28. A holder for photographic sensitized material having one or more dark slides adapted to be withdrawn from an end of the holder and having a slot-like formation for receiving each dark slide, a light valve or guard at the lateral face or faces of the holder below the upper end of the inserted dark slide or slides, said light valve or guard having a strip-like base secured to the holder in a position to be pressed upon by the camera back in use, and having a pile-fabric-like structure protruding from said base so as at that face of said structure that is the more remote from said base, to be pressed against the outer face of the adjacent dark slide when in position, the said light valve or guard constituting and providing means to relieve the pressure on said pile fabric portion thereof when the said holder is withdrawn from the camera and the dark slide is in position in the holder, thereby preventing compacting, packing down and setting of said pile fabric portion that would impair the light-excluding function of the said light valve or guard.

29. A holder for photographic sensitized material having one or more dark slides adapted to be withdrawn from an end of the holder and having a slot-like formation for receiving each dark slide, a light valve or guard at the lateral face or faces of the holder and including a pile-fabric-like structure secured to the holder so as, when in use, to be pressed inwardly by the camera back against the dark slide if positioned, or against an inner wall of the holder if the dark slide is withdrawn, so as to exclude light, said light valve or guard, due primarily to the inherent springiness of the fibers of the pile fabric and their consequent tendency to straighten out when permitted to do so, acting to relieve the pressure upon the said pile fabric at all times when the holder is not in the camera and the dark slide is in position, thereby preventing such compacting, packing down and setting of said pile fabric as would impair the light-excluding function of the light valve or guard.

30. A structure in accordance with claim 29, but wherein said pile-fabric-like structure is secured to a basal strip-like member that is itself secured to the holder, said basal strip-like member being itself sufficiently flexible to yield readily outwardly under the self-straightening tendency of said springy pile-fabric fibers, thereby establishing a condition of balance or equilibrium of said basal member and the fibers of said pile fabric.

BYRON L. SMITH.